Figure 4:
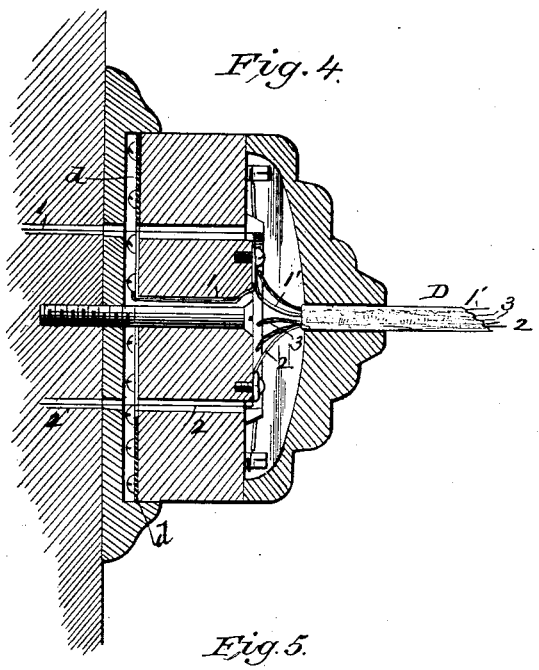

(No Model.) 3 Sheets—Sheet 1.
J. A. VANSANT & F. S. ANDERSON.
REGULATOR FOR ELECTRIC CURRENTS.
No. 387,464. Patented Aug. 7, 1888.
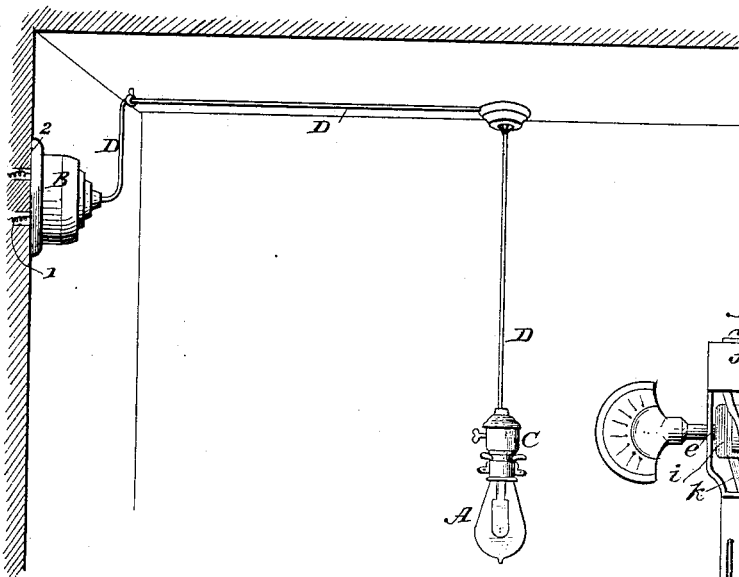
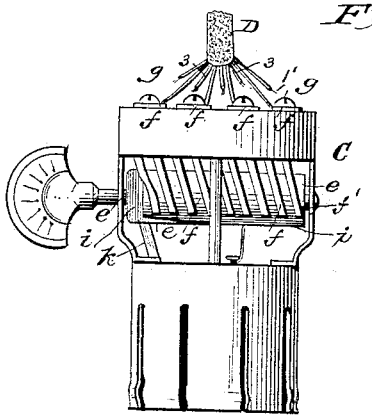
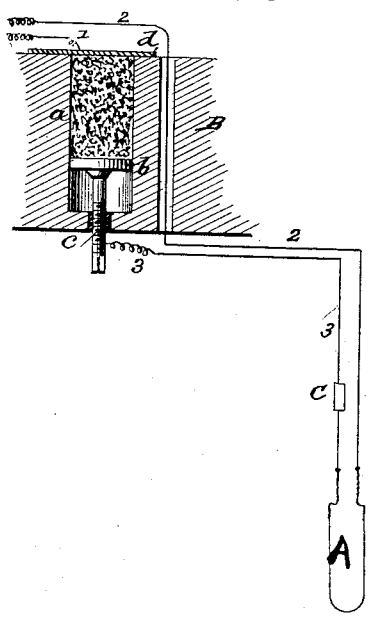
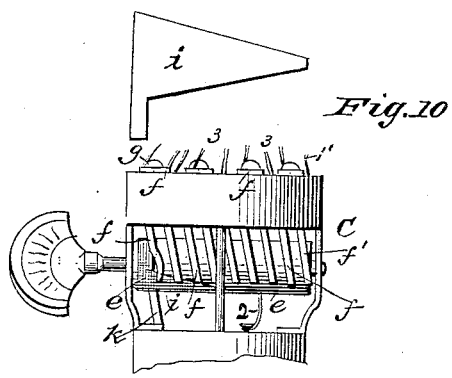
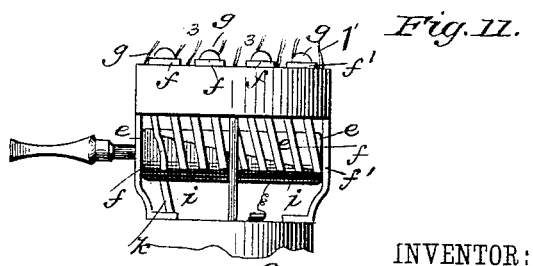
WITNESSES:
Fred G. Dieterich,
Amos W. Hart.
INVENTOR:
J. A. Vansant,
F. S. Anderson,
BY Munn & Co.
ATTORNEYS.

(No Model.) 3 Sheets—Sheet 2.
J. A. VANSANT & F. S. ANDERSON.
REGULATOR FOR ELECTRIC CURRENTS.
No. 387,464. Patented Aug. 7, 1888.
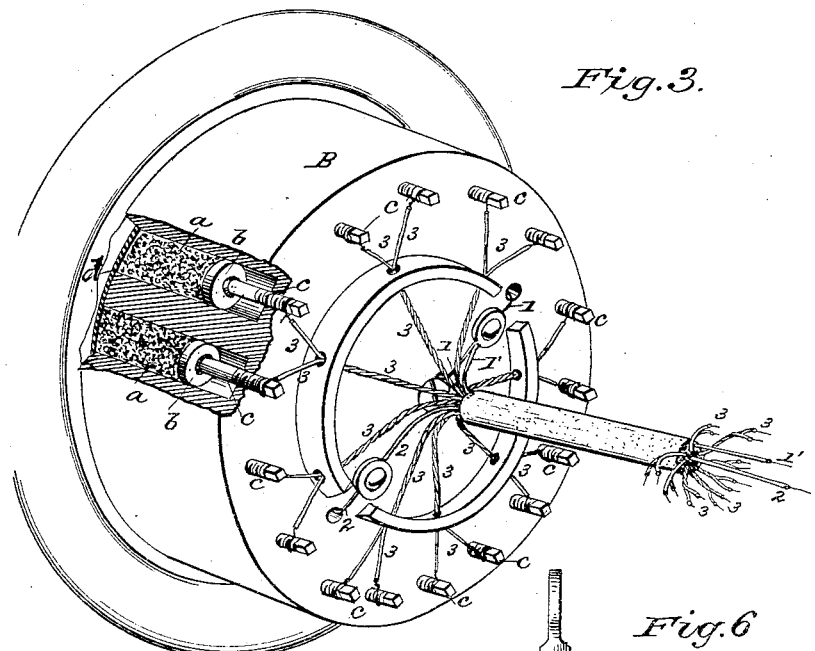
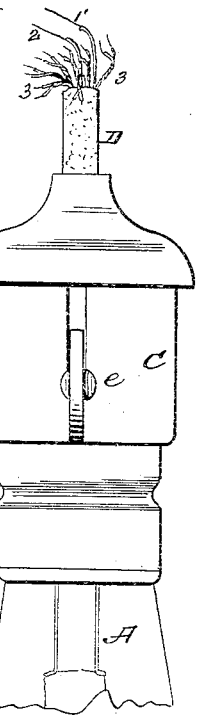
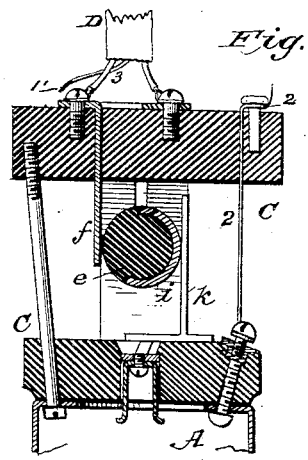
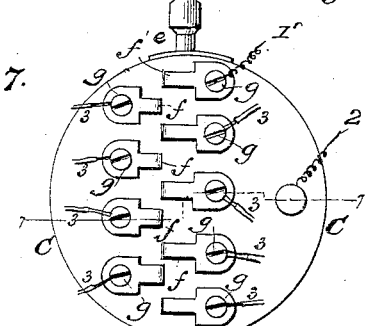
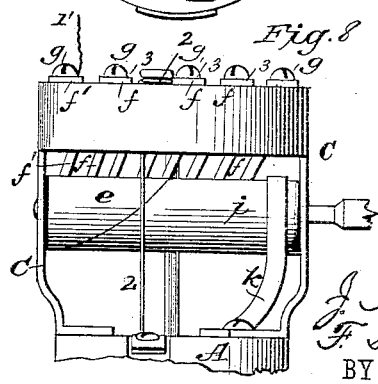

(No Model.) 3 Sheets—Sheet 3.

J. A. VANSANT & F. S. ANDERSON.
REGULATOR FOR ELECTRIC CURRENTS.

No. 387,464. Patented Aug. 7, 1888.

WITNESSES:
Fred G. Dieterich
Amos W. Hart

INVENTOR:
J. A. Vansant
F. S. Anderson
BY Munn & Co
ATTORNEYS.

UNITED STATES PATENT OFFICE.

JOSEPH A. VANSANT AND FRANK S. ANDERSON, OF EASTON, MARYLAND.

REGULATOR FOR ELECTRIC CURRENTS.

SPECIFICATION forming part of Letters Patent No. 387,464, dated August 7, 1888.

Application filed January 21, 1888. Serial No. 261,477. (No model.)

*To all whom it may concern:*

Be it known that we, JOSEPH A. VANSANT and FRANK S. ANDERSON, of Easton, in the county of Talbot and State of Maryland, have invented a new and useful Improvement in Regulators for Electric Currents, of which the following is a specification.

Our invention is designed to regulate the force of electric currents employed for producing light, supplying dynamos or motors, and electroplating, &c.

The regulator proper consists of one or more cells or receptacles containing a dry powder which possesses a certain low degree of conductivity when uncompressed, and means for compressing such powder to increase its conducting-power as required. In connection with such regulator proper we employ a circuit-breaker which is so constructed that it may be instantly adjusted to graduate the force of the current or to cut it off completely, as condition may require.

The regulator is placed in the circuit of the lamp, machine, or apparatus to which the current is supplied, (from a battery or other generator,) one of the wires of such circuit connecting with the cell or cells filled with the powdered substance before referred to, and passing thence to the circuit-breaker, which is in turn connected with the lamp or other terminal of the circuit. The other or return wire passes by the circuit breaker and regulator proper without electrical contact therewith, as will be readily understood.

The powdered substance we employ is composed of carbon and mineral wool (spun glass) intimately mixed together. The proportions of these ingredients may vary greatly; but equal proportions or two-thirds carbon to one-third mineral wool seem to answer the purpose best. While we claim this substance as part of our improved regulator because of advantages it possesses over others, we do not propose in all cases to restrict ourselves to its use, since other compressible materials may answer the purpose sufficiently well to be more or less practicable. For example, carbon and dry sawdust or carbon and sand may perhaps be made available.

We will now describe our invention by reference to accompanying drawings, (three sheets,) in which—

Figure 12:
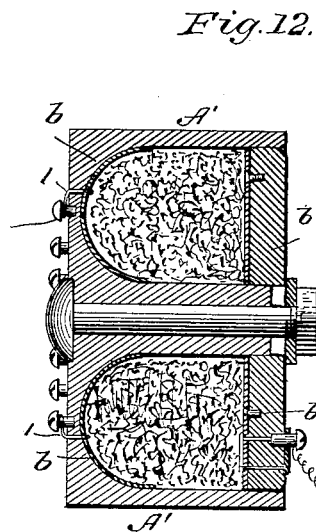
Figure 5:
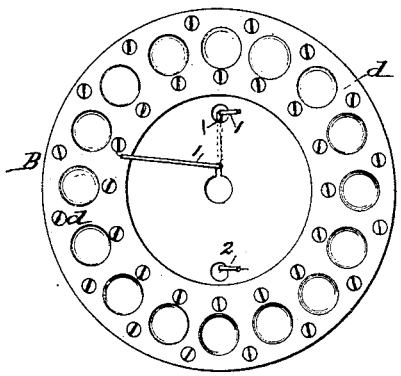
Figure 13:
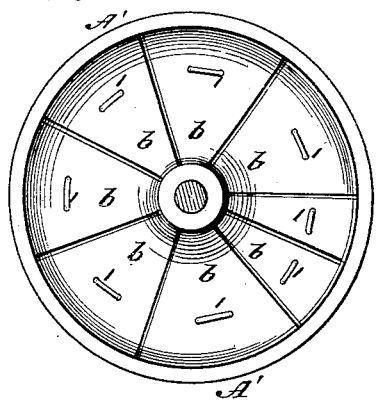

Figure 1, Sheet 1, is a perspective view showing the arrangement of the complete apparatus for practical use. Fig. 2 is a diagrammatic view illustrating the principle of the invention. Fig. 3, Sheet 2, is a perspective view showing the apparatus enlarged to normal size, part of the regulator proper being broken out to show the interior construction. Fig. 4, Sheet 3, is a vertical central section of the regulator proper. Fig. 5, Sheet 3, is a plan view of the inner face or side of the regulator proper. Figs. 6, 7, 8, Sheet 2, are respectively a plan view of the top of the circuit-breaker, a vertical section of the same, and a side view. Figs. 9, 10, and 11, Sheet 1, are side views of the circuit-breaker, showing different positions of the rotary cylinder. Fig. 12, Sheet 3, is a central vertical section of a modified form of the regulator proper. Fig. 13, Sheet 3, is a plan view of the interior of the same.

We shall in the first instance describe the invention shown in Figs. 1, 3, 4, and 5 of said drawings. We show our invention in connection with an incandescent lamp, A, for use with which it is particularly well adapted. For the purposes of illustration and description, the wire conducting the current from the battery or dynamo (not shown) we designate by the numeral 1, and the return-wire by the numeral 2. The wire 1 connects metallically with the regulator proper, B, which has a series of cells, and the current is carried therefrom to the circuit-breaker C by a series of wires, 3, Fig. 3, Sheet 2, which for practical purposes are separately insulated by winding with silk or cotton in the usual way, and are all united in a single cord or cable, D, which is in turn wrapped with some suitable insulating material. The return-wire 2 is likewise included in the cable D, but passes by (or through) the regulator proper, B, without any electrical contact therewith.

In order to enable the invention to be more readily understood, we illustrate it by way of diagram in Fig. 2 with but a single cell in circuit. Thus the cell proper, a, made of some non-conducting material, is shown filled with the dry powder composed of carbon and mineral wool, as before described. As a means for compressing such material we employ a device in the nature of a piston or plunger, For economy we use a disk, b, and a screw, c, the latter working in a threaded sleeve secured in the base of the cell a, and having its projecting end squared or flattened to permit convenient application of nippers or other device for turning the screw. The wire 1 connects with the powder in said cell, passes thence to the circuit-breaker C, and then to the lamp A. The return-wire 2 passes by the circuit-breaker and regulator, as shown. If the screw c be turned so that the disk or plunger b is forced against the powder in cell a, and thus made to compress it to a certain degree, the conductivity of such material is increased corresponding to the pressure, and this effect will be heightened by further compression. In short, by adjustment of the plunger b, and thus varying the compression, any practically requisite degree of conductivity may be obtained. Thus the regulator acts substantially like a rheostat, but has certain advantages over the latter when constructed in the usual way which render it far superior and preferable in use.

We will now indicate the construction of the multiple-cell regulator proper, B, shown in Figs. 1, 3, 4, and 5.) It has sixteen cells, a, arranged in a circle, having a plunger or disk, b, and adjusting-screw c for each cell, as before described. The body of the device B may be made of porcelain, rubber, or any other suitable non-conducting material. The top d of of the device is a detachable copper plate of annular form. It is secured in place by screws after the cells a have been filled with the powder. Both the current-wires 1 and 2 pass through holes in the central portion of the regulator B, and while the negative or return wire 2 is mechanically connected with the regulator B the positive wire 1 is branched, one part being attached to the copper-plate d, and thus electrically connected with all the cells a, while the other part or branch, 1', extends (through cable D) to the regulator C, where it connects with a finger, f', Fig. 6, for a purpose hereinafter explained. The cells a are put in electrical connection with the said regulator by means of screws c, wires 3, and fingers f, Figs. 3 and 6; but it will be seen in Fig. 3 that we connect two screws c, and thereby electrically combine two cells by a single wire 3. This is, however, an arbitrary arrangement, as each wire 3 may lead from but one screw and cell or from two or more, as the size of the cells or other conditions may require. Ordinarily we propose that sixteen cells shall be sufficient for a sixteen-candle light. This regulator B is designed to be placed at any suitable point in a dwelling or other building to be lighted by one or more lamps A. It is suitably capped for protection, Figs. 1 and 4, and supported by brackets or screws near the ceiling of an apartment, so as to be out of the way. In manufacturing the regulator at the factory the last step is to adjust the plunger b of each cell a so that the compression of the powder therein is such that the current through it will suffice to produce a faint-red glow of the carbon bow in an ordinary incandescent lamp. In this condition the regulator proper, B, is furnished already regulated as required for use, and no further manipulation or adjustment will ordinarily be necessary to insure its proper working at any subsequent period. Still it is obvious that, if any contingency should arise by which further compression should be desirable, it can be effected at any time by simply turning the screws c.

Our improved circuit-breaker C, Figs. 6, 7, and 8, is constructed (with reference to the multiple-cell regulator proper B) of an adjustable or rotary plug or cylinder, e, and a series, (eight,) of metallic fingers or points, f, each of which latter is the electrical terminal of one of the conducting-wires 3, before described. The said fingers f pass through an insulating-block, and their upper ends are bent down on the upper side of the same, Fig. 6, and provided with holes to receive screws g, to which the wires 3 are also attached.

The plug or cylinder e is journaled in parallel metal arms, which connect the aforesaid block with the ordinary holder of an incandescent lamp, and the fingers f bear on its periphery with an elastic pressure.

The body of the cylinder E is made of wood or of some other non-conducting material, and a thin metal plate, i, of V form, Fig. 10, is attached to and fitted closely around it. At its base such plate i completely encircles the cylinder, and a spring, k, Fig. 8, bears on this encircling band and puts the plate i in circuit with the lamp A.

It will now be apparent that when the cylinder e is adjusted, as shown in Figs. 7 and 9, all the fingers f rest on the non-conducting portion of the same, and hence the current is completely cut off from the lamp A. If, however, the cylinder e be turned a short distance—say about one-eighth of a revolution—then one of the fingers f will bear on the metal plate i, as shown in Fig. 10, and hence the current from one pair of cells a will pass to the lamp and produce illumination accordingly—that is to say, a somewhat dull-red glow. By turning the cylinder one-quarter round, as shown in Fig. 11, all the eight fingers f will be brought into contact with the plate i, and thereby the current will be allowed to pass through all the cells, and the highest incandescence the current can produce will be obtained. If the cylinder e be turned to an intermediate point between complete extinction and full illumination, then four fingers f will come in contact with plate i, four pairs of cells a will be brought into the circuit, the strength of the current will be one-half its full amount, and a corresponding degree of incandescence will be produced. It is thus practicable to graduate the illuminating-power of one lamp or a whole series of lamps to any degree required by the simple and easy adjustment of the cylinder e on its axis.

The function of the branch wire 1' from the battery-wire 1 (before referred to) is to enable the full force of the free current to be applied to the lamp A when desired without passing the current through the regulator B—that is to say, the eight wires marked 3 and the eight fingers $f$ of the circuit-breaker C conduct the current from the sixteen cells $a$, and owing to the resistance of the latter the full incandescence of the lamp is thus not obtained; but by turning the cylinder $e$ slightly farther than is shown in Fig. 11, Sheet 1, the ninth finger (marked $f'$) will touch the metal plate $i$, and thus a free circuit will be formed through it and the connected wires 1 and 1' and the return-wire 2, and no current will pass through the regulator, upon the familiar principle that the current will take the line of least resistance. Thus the full strength of the battery will be utilized and the maximum incandescence of the lamp obtained.

In Figs. 11 and 12 we show a modification of the multiple-cell regulator or regulator proper. It consists in part of cup-shaped shell A', to whose head on the inner side are applied several copper plates, which are connected exteriorly with the screws to which the wires 1 are also attached. The cup-shaped body A' is filled with powder, and has a plunger or follower, $b'$, which may be adjusted by a screw-nut, $c'$, to vary the pressure on the powder inclosed. The inner side of the follower $b'$ is faced with copper, and wires 3 are connected with it, as shown.

A regulator proper in this form has certain advantages, but is not on the whole so effective as the one first described; but it illustrates one mode of carrying out one principle of our invention.

What we claim is—

1. The electrical-current regulator proper, consisting of a cell or receptacle, a powdered material which is composed of conductive and non-conductive substances, which are in the form of dry powders intimately mixed together and contained in said receptacle, a movable plunger by whose adjustment the said material may be compressed more or less for the purpose of securing the desired degree of conductivity, and metallic circuit-connections which are in contact with the powdered material, substantially as shown and described.

2. The electrical-current regulator proper, consisting of a cell or receptacle, a powdered material consisting of carbon and mineral wool and contained in such receptacle, a movable plunger by whose adjustment the said material may be compressed more or less for the purpose of securing the desired degree of conductivity, and metallic circuit-connections which are in contact with the powdered material, substantially as shown and described 3. The multiple-cell regulator proper, consisting of a series of cells or receptacles filled with powdered carbon and mineral wool, a metal plate forming the top of the said cells, a movable plunger for each cell, and circuit-wires which connect with said plate and the powdered material, as shown and described.

4. The combination, with the regulator proper, consisting of a series of cells containing a powdered conductive and non-conductive material and a plunger for compressing it, of cells and the circuit-breaker formed of a series of metal fingers and a rotatable cylinder whose periphery is divided into conducting portions, and a series of insulated circuit-wires which connect the said cells and fingers, and a disconnected return-wire, all substantially as shown and described, whereby the rotary adjustment of the cylinder graduates the strength of the current in the circuit or cuts off the current altogether, as specified.

JOSEPH A. VANSANT.
FRANK S. ANDERSON.

Witnesses:
JOHN C. HENRY,
JOHN SUTTERFIELD.